April 14, 1959 T. R. BILL 2,882,070
AUTOMATICALLY RETRACTABLE HITCH LEG
Filed May 6, 1957 2 Sheets-Sheet 1
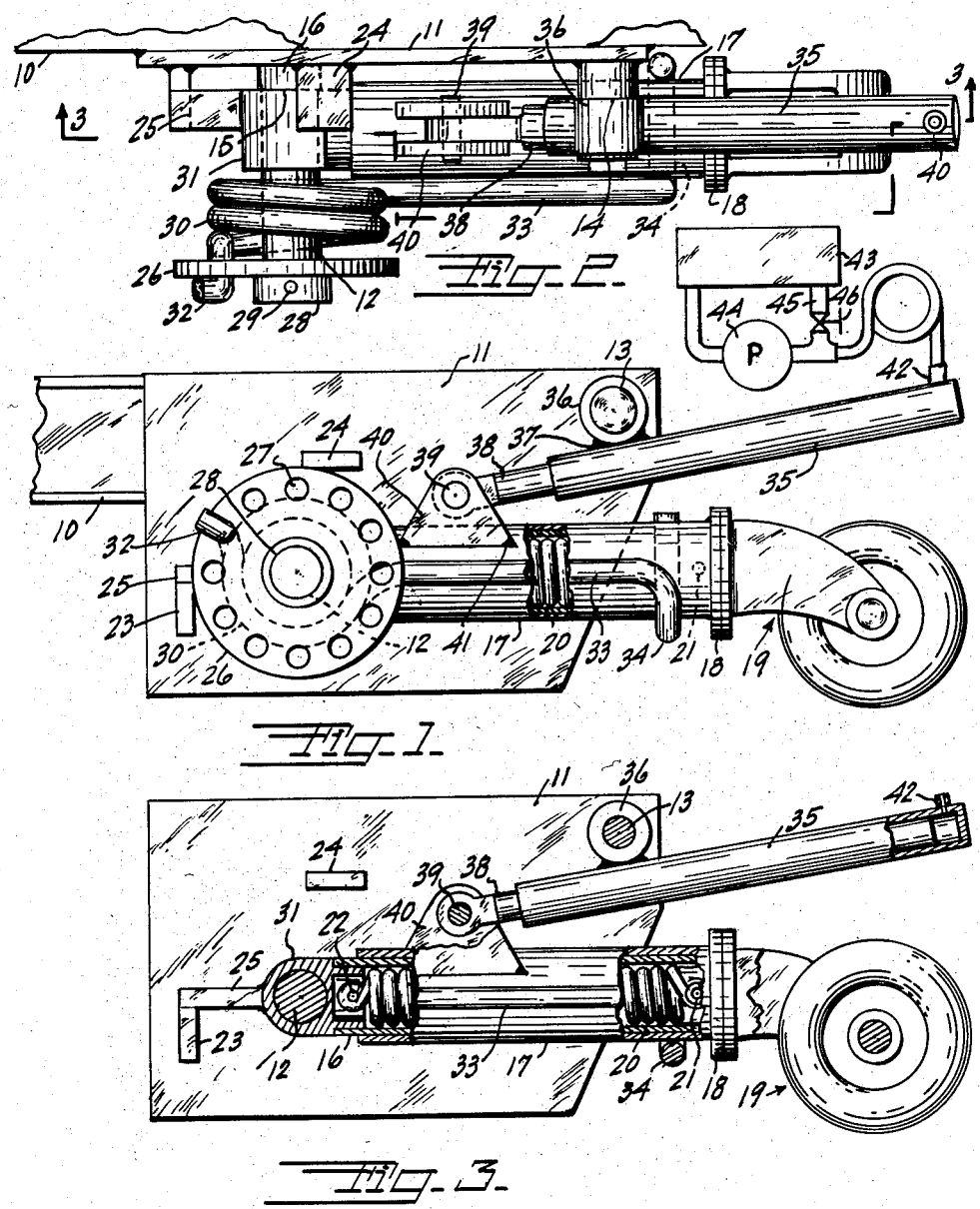
INVENTOR.
Theodore R. Bill
BY Philip A. Fruedall
Attorney

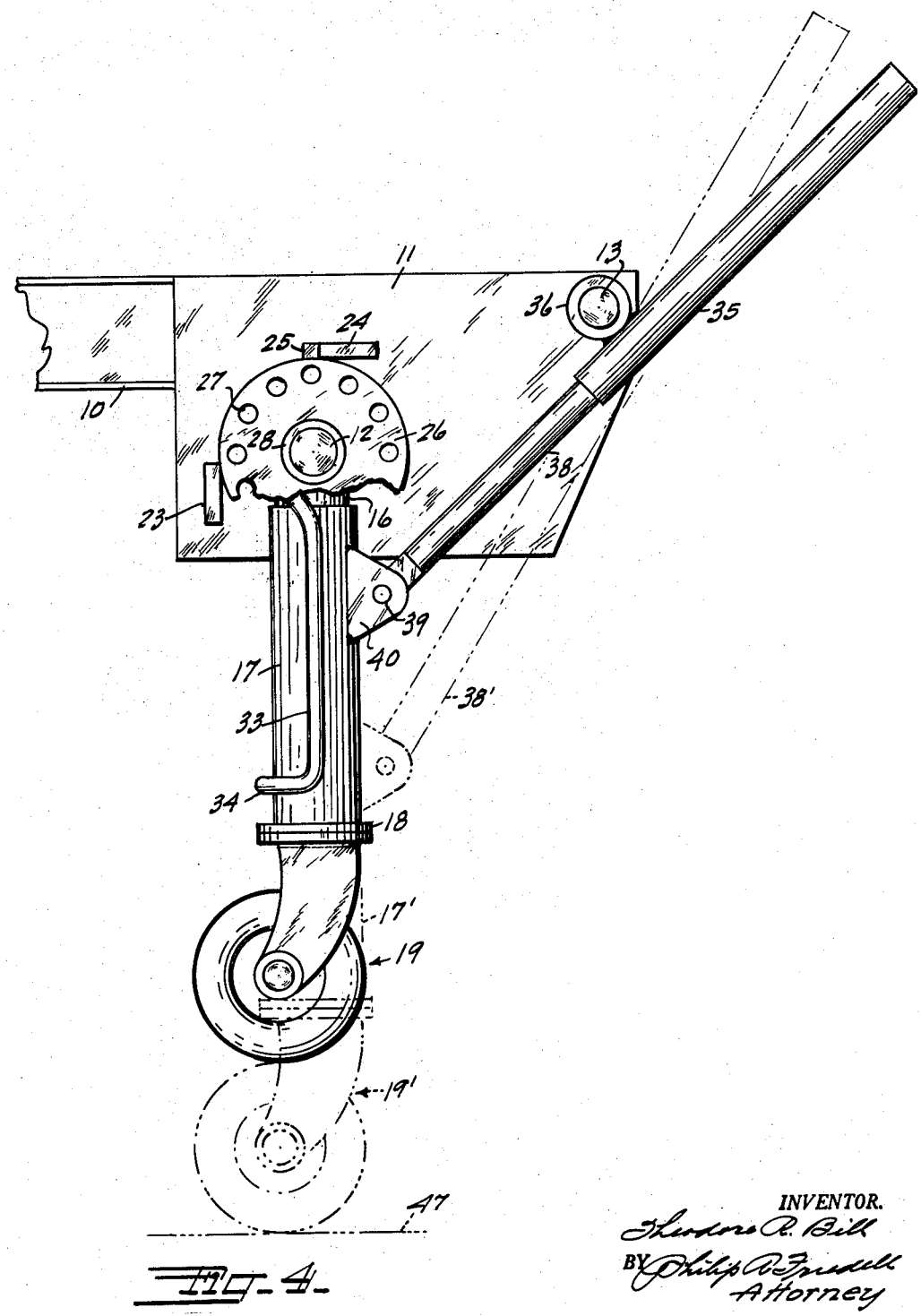

United States Patent Office 2,882,070
Patented Apr. 14, 1959

2,882,070

AUTOMATICALLY RETRACTABLE HITCH LEG

Theodore R. Bill, San Leandro, Calif.

Application May 6, 1957, Serial No. 657,226

1 Claim. (Cl. 280—475)

This invention relates to improvements in means for supporting the front end of a two-wheeled trailer, semi-trailer, cable carrier, or like vehicles, and provides a fluid operated leg which upon the application of fluid under pressure, move the leg to a vertical position and project the caster wheel or shoe to contact with the supporting surface and support the forward end of the vehicle on which it is mounted, and, which upon release of the fluid will automatically retract the caster wheel or shoe from the supporting surface and swing the leg up to a non-obstructive position without recourse to any type of external power, the leg automatically swinging and holding in the non-obstructive position.

This invention can be mounted on a tongue or hitch, or on the front or underside of the body of a vehicle, and merely requires a fluid jack with a single fluid connection, a source of fluid under pressure, and a single valve for its operation.

The objects and advantages of the invention are as follows:

First, to provide a power operated leg for the front end of a trailer or the like.

Second, to provide a power operated leg for a hitch or the like with which the hitch can be raised or lowered for coupling and uncoupling from a tractive device, and which will support the front end of the vehicle in any desired elevation.

Third, to provide a leg as outlined, which upon release of the power, will return to an elevated, non-obstructive position.

Fourth, to provide a leg as outlined which is simple in operation, and controlled solely by a source of power for projection, with the leg automatically returning to non-obstructive position through release of the source of power.

In describing the invention reference will be had to the accompanying drawings, in which:

Fig. 1 is a side elevation of the invention as applied to a tongue or hitch or the like, and shown in its fully retracted position.

Fig. 2 is a top plan view of Fig. 1.

Fig. 3 is a sectional front view taken on line 3—3 of Fig. 2.

Fig. 4 is a front view showing the operation of the invention.

The invention may be mounted on a tongue or hitch 10, or on the forward end or underside of a trailer or semi-trailer or like vehicle, and consists of a mounting plate or support 11 having a stub shaft 12 fixed thereto for the leg, and a second stub shaft 13 for the fluid jack fixed in spaced relation to the shaft 12, the shafts each having an enlarged portion extending from the mounting plate to form a shoulder respectively 15 and 14 for proper spacing of the leg and jack for clearing the plate and adjacent members.

Pivotally mounted on the shaft 12 is the upper end of the leg or plunger 16 which is of tubular construction and which is slidable in the tubular leg extension or boot 17. This boot may terminate in a base 18 or as shown, may terminate in a caster 19.

The leg and boot are retained normally in retracted position by a tension spring 20 one end of which is connected to the bottom of the boot as indicated at 21, and with the other end connected to the upper end of the leg as indicated at 22, the spring being interiorly of the leg and boot as shown. Two stop members 23 and 24 are fixed on the mounting plate to engage the finger 25 respectively when the leg is retracted and when it is projected to the vertical position, the retracted position being illustrated in Figs. 1, 2 and 3, while the projected position is illustrated in Fig. 4.

The shaft 12 extends outwardly from the leg and terminates in a disc 26 which is rotatable thereon and which has a circular series of passages 27 and a hub 28 which is secured by means of a pin 29.

A torsion spring 30 has its coils located between the leg bearing 31 and the disc with the terminal end 32 engaged through one of the passages 27, the other end of the torsion spring extending along the side of the boot as indicated at 33 thence being formed into a cradle 34 to engage about the underside of the boot. To obtain the proper tension in this torsion spring, the pin 29 is removed, the disc is slipped off the end of the shaft, the spring terminal is passed through one of the passages then forced about by means of a spanner wrench or the like until the pin 29 can be re-inserted. Thus the torsion spring can be adjusted to provide just the proper reaction for positive retraction of the leg, retraction being limited by cooperation of the finger 25 with the stop 23.

The jack 35 is pivotally mounted on the stub shaft 13, its bearing 36 being fixed to the side of the cylinder as indicated at 37. The plunger 38 for this jack is pivotally connected to the boot 17 as indicated at 39, the brackets 40 being fixed to the boot as by welding indicated at 41.

The jack has a single fluid connection 42, the source of power being indicated as a pressure tank 43, or supply tank with a pump 44 communicating between the supply tank and the jack with a bypass 45 controlled by a valve 46.

The operation of the invention is as follows: The pump 44 may be a hand pump or a power driven pump. When the pump is operated, the fluid from the supply 43 is delivered to the head end of the cylinder 35 at 42, forcing the plunger 38 outwardly and forcing the leg to swing down to a vertical position at which point the finger 25 engages the stop 24, as indicated in solid lines in Fig. 4. After this point has been reached, the plunger continues to force the boot 17 down as indicated by the dotted figure 17', 19', 38' against the tension of the spring 20 until the caster 19 reaches the supporting surface 47. At this point the front end of the vehicle is in its tractor-supported position. If it is desired to uncouple the trailer, semi-trailer or other vehicle from the tractive device, the pump is operated to lift the front end of the vehicle sufficiently to uncouple the hitch, and when the vehicles are to be recoupled, the leg is permitted to retract by opening the valve 46, the tension spring within the leg retracts the boot, causing the plunger to force the fluid back to the supply tank, and after the boot has fully retracted, the torsion spring swings the leg up to its non-obstructive position, the fluid in the cylinder 35 cushioning the retraction and causing the folding of the leg without shock, thus automatically returning the leg to a folded or non-obstructive position, and the torsion and tension springs positively hold the leg in the retracted or folded position, requiring no locking or latching means.

I claim:

A leg for the forward end of a trailer or the like, in combination, a support, a leg comprising a plunger and a boot, with the boot slidable on the plunger, retractive means cooperative between the boot and the plunger for retracting the boot on the plunger, a pivotal mounting on said support for the upper end of said plunger, and stop means cooperative between the leg and the support for limiting swinging movement of said leg to vertical and to retracted substantially horizontal positions, a fluid jack pivotally mounted on said support and having a fluid connection at the upper end thereof and with the lower end pivotally connected to said boot, spring means cooperative between the plunger and said pivotal mounting for retracting said leg to the horizontal position, and a supply of fluid and control means therefor for said fluid connection for initially advancing said leg to a vertical position and continuing by advancing of the boot to contact with a supporting surface, said retractive means and said spring means retracting said boot on said plunger and continuing by retraction of said leg to a horizontal non-obstructive position upon release of said fluid through the medium of said control means, said pivotal mounting comprising a shaft fixed in said support with the upper end of the plunger mounted thereon, a disc rotatable on said shaft, and means cooperative between the disc and the shaft for securing said disc against rotation on said shaft, said spring means comprising a torsion spring encircling said shaft and having one terminal end anchored in said disc and the other end slidably cooperative with said boot to compensate for axial movements of the boot and for swinging said boot from the advanced vertical position to an angularly retracted horizontal position.

References Cited in the file of this patent

UNITED STATES PATENTS

| | | |
|---|---|---|
| 1,639,054 | Palmer | Aug. 16, 1927 |
| 1,783,822 | Bolard | Dec. 2, 1930 |
| 1,987,049 | Burnelli | Jan. 8, 1935 |
| 2,358,488 | Black | Sept. 19, 1944 |
| 2,362,016 | McKinnie | Nov. 7, 1944 |
| 2,431,245 | Haig et al. | Nov. 18, 1947 |
| 2,739,779 | Krone et al. | Mar. 27, 1956 |
| 2,742,662 | Lyons | Apr. 24, 1956 |

FOREIGN PATENTS

| | | |
|---|---|---|
| 179,988 | Great Britain | Nov. 15, 1921 |
| 424,367 | Great Britain | Feb. 20, 1935 |
| 286,303 | Switzerland | Oct. 15, 1952 |